J. P. FULGHUM,

Assignor to himself and WAYNE AGRICULTURAL CO.

Grain Drill.

No. 9,341. Reissued Aug. 10, 1880.

Attest:
Donn P. Tritchell.
William M. Dodge.

Inventor.
Jesse P. Fulghum.
By his Atty.
John E. Hatch.

UNITED STATES PATENT OFFICE.

JESSE P. FULGHUM, OF RICHMOND, INDIANA, ASSIGNOR TO HIMSELF AND WAYNE AGRICULTURAL COMPANY, OF SAME PLACE.

GRAIN-DRILL.

SPECIFICATION forming part of Reissued Letters Patent No. 9,341, dated August 10, 1880.

Original No. 145,795, dated December 23, 1873. Application for reissue filed March 15, 1879.

*To all whom it may concern:*

Be it known that I, JESSE P. FULGHUM, of Richmond, Wayne county, Indiana, have invented a new and useful Seeding Mechanism for Grain-Drills, of which the following is a specification.

This invention relates to that class of implements in which grain is conducted from the hopper to the delivery spout or tube by means of a feed-wheel or wallower that rotates within the seed cup or box; and it relates particularly to those rotary droppers in which provision is made for increasing and diminishing the rate of feed or delivery without change of speed by moving the feeding devices laterally within the cup or case, so as to expose a greater or less carrying-surface and a feed-passage of corresponding size.

My present invention consists in a peculiar combination of a feed cup or case having shaft-bearings in its sides, a feed-wheel supported therein, a non-circular axially-sliding shaft, a cut-off disk, and a guard-plate attached to the shaft so as to slide therewith relatively to the feed-wheel and case; also, in combining with a feed-wheel having ribs to act upon the grain a hub or sleeve of smaller diameter than the wheel, so as to expose both the periphery and the ends of the ribs to act upon the grain.

Figure 1:
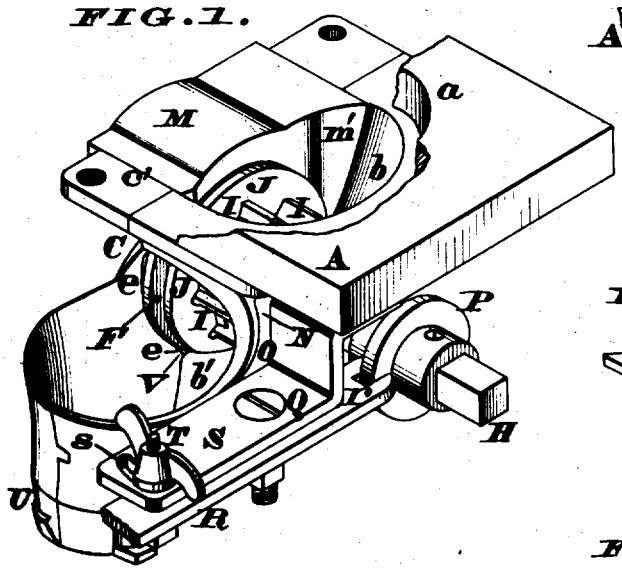
Figure 4:
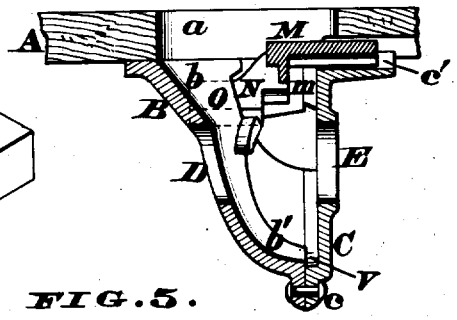
Figure 5:
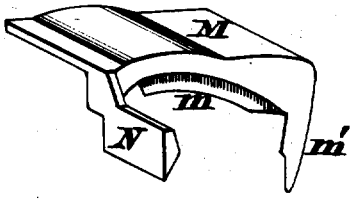
Figure 6:
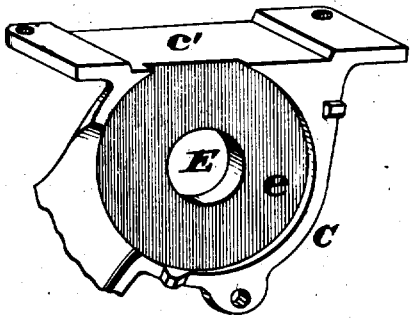
Figure 2:
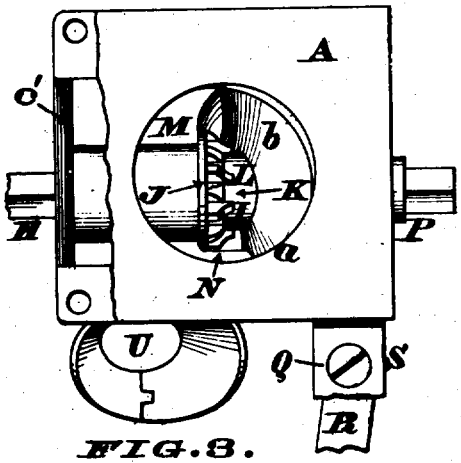
Figure 7:
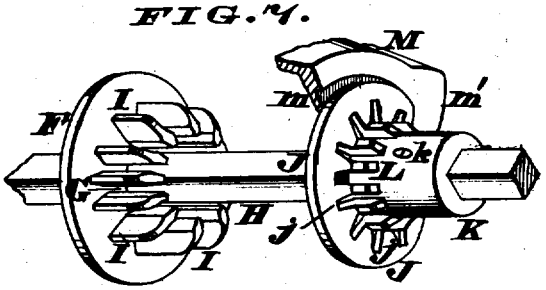
Figure 3:
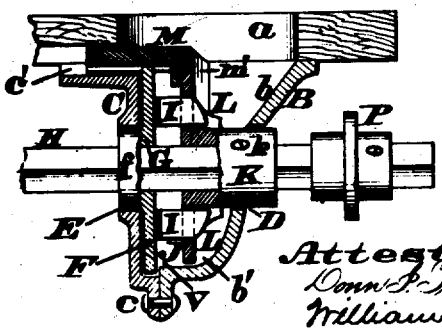

Figure 1 is a perspective view of my improved form of cut-off, the hopper of the implement, and also the shifting-lever, being broken away, so as to exhibit more clearly the operative parts. Fig. 2 is a plan of the cut-off and its accessories. Fig. 3 is a vertical section through the seed-cup in the plane of the feed-shaft. Fig. 4 is another vertical section through the seed-cup, with the feed-wheel and cut-off removed. Fig. 5 is a perspective view of the shiftable plate or guard that prevents the entrance of grain between the feed-wheel and cut-off. Fig. 6 is a perspective view of the casting that constitutes the flat side of the seed-cup; and Fig. 7 is a perspective view of the feed-wheel and cut-off separated from each other, the latter having the sliding plate applied to it.

A represents a portion of the bottom of a grain-drill hopper, having an aperture, *a*, in it to admit the seed to the feed cup, case, or box, which is secured to the under side of said hopper. This seed cup or box consists, essentially, of two castings, B and C, of which the one, C, is a flat vertical plate, while the other one, B, has an inward slope, *b*, and a converging bottom, *b'*. The lower portions of these plates are united by a rivet or bolt, *c*.

The castings B C are provided, respectively, with circular apertures D and E, for a purpose which will presently appear. The casting C has a circular depression or pit, *e*, for the reception of a disk, F, whose hub *f* is adapted to rotate within the aperture E of said casting. The disk F, together with its hub *f*, is pierced with a non-circular aperture, G, through which the correspondingly-formed feed-shaft H passes loosely. This shaft may be rotated from the ground-wheels of the implement either by gearing, belts, or any other suitable mechanism.

Projecting from the inner face of the disk F are a number of radial blades, I, that are adapted to engage with and occupy the correspondingly-shaped apertures *j* of the adjustable cut-off disk J. The hub K of this cut-off is rigidly attached to the feed-shaft H by a screw or pin, *k*.

Extending from the hub K to the disk J, and interposed between its apertures *j*, are a series of radial ribs, L, which ribs, in connection with the blades I, constitute the feeding mechanism proper.

Perforated so as to fit snugly around, but to play easily upon the feed-wheel, and adapted to be shifted simultaneously with the cut-off J, is a sliding plate, disk, or collar, M, that traverses a channel, *c'*, in the upper end of casting C, and said plate is provided with a flange, *m*, a tongue, *m'*, and a horizontally-projecting guide, N, which latter is adapted to play within the slot O in the casting B.

It will be seen, on reference to Figs. 1, 2, and 5, that the guide N is, in fact, a slide, and that it lies above the hub or sleeve K, extending from the inner or feeding side of the wheel across the grain space or passage and outward through the side of the cup or case. The guide thus arranged moves endwise with the wheel and sleeve in their adjustment, and acts jointly with the sleeve or hub as a stop to prevent the grain from escaping backward through the upper part of the cup above the hub.

The flange *m* is located behind the disk J, while the tongue *m'* projects down in front of the same, by which means any shifting movement of said disk is imparted directly to the sliding plate M. This shifting of the cut-off J and its accompanying guard-plate M is effected by a lever, R, whose forked end *r* engages with a collar, P, that is secured to the feed-shaft H.

The lever R is pivoted at Q to a bar, S, whose outer end is pierced with a slot, *s*, to receive a screw-threaded stud, T, that projects upwardly from said shifting-lever. A thumb-nut, *t*, or equivalent device, maintains said lever at any specific adjustment.

U is a neck, to which the grain spout or tube may be applied in any approved manner.

When the castings B and C are bolted together a shoulder, V, is formed, which shoulder maintains the disk F in its proper position within the circular recess *e* of the casting C.

When it is desired to pass a large quantity of grain through the seed-cup the lever R is shifted so as to force the disk J closely back against the wheel F, which shifting of the disk J causes a corresponding retraction of the sliding gage-plate. The throat of the seed-cup is now unobstructed, and the blades I, together with the ribs L, are free to conduct all descending grain from the hopper into the neck U of the grain-tube. This arrangement of the cut-off mechanism is clearly shown in Fig. 1.

It will be seen that the hub K is of smaller diameter than the feed-wheel, and that the grain-carrying ribs or teeth are thereby exposed to the grain both at their ends and their peripheries.

The exposure of the ends of the ribs of a feed-wheel to the grain, so that they may assist in agitating and advancing the same, is a new feature in this class of devices.

To limit the amount of grain passing through the seed-cup it is only necessary to shift the lever R in such a manner as to advance the cut-off disk J and its accompanying gage-plate M, which movement not only contracts the throat of the feed-cup, but also reduces the projection of the blades I, or the distance to which they extend into the feed-cup, and thereby diminishes the amount of grain that said blades and the ribs L are capable of delivering into the neck U. This limited capacity of the seed-cup is clearly shown in Figs. 2 and 3.

The lever R can be set at any intermediate position, so as to graduate the feed according to circumstances.

As the guard or gage plate M is advanced or retracted simultaneously with the cut-off disk J, it will be seen that no opportunity is afforded for grain to enter between the disks F and J, and consequently no accidental discharge of seed can occur. Neither can the operative parts ever become clogged or choked up. The two disks F and J being arranged so as to rotate in unison with one another greatly simplifies the construction of my apparatus and renders it much less liable to get out of order than it would be in case each disk was driven by independent gearing or other mechanism.

The employment of means for simultaneously contracting the feed-cup and the effective portion of the feed-wheel is not broadly claimed as new.

I claim as my invention—

1. In an adjustable feeding device for seeding-machines, the combination of a feed cup or case, a feed-wheel having longitudinal ribs, and a sleeve in line with the wheel, the sleeve extending through and closing an opening in the side of the cup or case, and being made of smaller diameter than the wheel, so as to permit the free access of the grain to both the periphery and the ends of the ribs.

2. In a variable force-feed for seeding-machines, the combination of a fixed feed cup or case, a rotary wheel having longitudinal ribs to act upon and advance the grain within the cup, and a sliding hub or sleeve arranged upon a common axis with the wheel, made of smaller diameter than the ribbed portion of the same and extended closely through an opening in the side of the cup.

3. In a variable force-feed for seeding-machines, the combination of a feed cup or case, a revolving laterally-adjustable feed-wheel located within the cup and provided with external feeding ribs or teeth extending in line with the axis, and a hub or sleeve of less diameter than the series of ribs or teeth, movable laterally with the wheel, and extended therefrom through the grain-space and outward through the side of the cup or case.

4. The combination of a feed cup or case, a feed-wheel having longitudinal ribs or teeth to advance the grain through the cup, a sliding sleeve or hub of less diameter than the circle of ribs extending from the wheel closely through the side of the cup, and a guide or cut-off located above and arranged to slide with the sleeve, and acting jointly therewith to prevent the grain from escaping backward through the upper part of the cup.

5. In a grain-drill feed, the combination of the two-part vertically-divided cup or case, a vertical disk seated at its edge between said parts, a laterally-adjustable ribbed wheel, J, located in the cup, and a sliding hub located at the side of the wheel and extending therefrom closely through an opening in the grain side of the cup, the sleeve being made of smaller diameter than the wheel to expose the ends of the ribs to the grain, substantially as described and shown.

6. The box composed of the castings B C, having the shoulder V formed therein, the loose feed-wheel F, supported within the box, the non-circular driving-shaft H, adapted to slide axially, and the cut-off disk J and guard-plate M, attached to the driving-shaft and sliding therewith, all constructed and combined substantially as herein described, for the purpose specified.

7. In combination with the shiftable and rotating driving-shaft H, with its attached cut-off disk J, the lever R *r*, bracket S *s*, stud and thumb-nut T *t*, and pivot Q, for the object designated.

JESSE P. FULGHUM.

Witnesses:
ARTHUR STEAL,
WILLIAM L. WRIGHT, Jr.